(12) United States Patent
Kreger et al.

(10) Patent No.: US 9,109,969 B2
(45) Date of Patent: Aug. 18, 2015

(54) CO-REGISTRATION OF CORES IN MULTICORE OPTICAL FIBER SENSING SYSTEMS

(75) Inventors: Stephen T. Kreger, Blacksburg, VA (US); Paul F. Wysocki, Blacksburg, VA (US); Jeff T. Lacroix, Christiansburg, VA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 0 days.

(21) Appl. No.: 14/126,536

(22) PCT Filed: Jun. 12, 2012

(86) PCT No.: PCT/US2012/042032
§ 371 (c)(1),
(2), (4) Date: Dec. 16, 2013

(87) PCT Pub. No.: WO2012/173979
PCT Pub. Date: Dec. 20, 2012

(65) Prior Publication Data
US 2014/0112615 A1  Apr. 24, 2014

Related U.S. Application Data

(60) Provisional application No. 61/496,600, filed on Jun. 14, 2011.

(51) Int. Cl.
*G02B 6/00* (2006.01)
*G02B 6/44* (2006.01)
(Continued)

(52) U.S. Cl.
CPC ............ *G01L 1/242* (2013.01); *G01B 11/16* (2013.01); *G01B 11/18* (2013.01); *G02B 6/022* (2013.01); *G02B 6/441* (2013.01); *G02B 6/4403* (2013.01);
(Continued)

(58) Field of Classification Search
CPC ...... G02B 6/022; G02B 6/441; G02B 6/4413; G02B 6/4405; G02B 6/4427; G02B 6/4403
USPC .................................................... 385/13, 111
See application file for complete search history.

(56) References Cited

U.S. PATENT DOCUMENTS 4,443,698 A * 4/1984 Schiffner ................. 250/227.19
5,531,064 A * 7/1996 Sawano et al. ................. 57/204
(Continued)

FOREIGN PATENT DOCUMENTS

JP    2001208923 A    8/2001
KR    10-2006-0102127   9/2006

OTHER PUBLICATIONS

International Search Report for PCT/US2012/042032, mailed Feb. 26, 2013.
(Continued)

*Primary Examiner* — Jerry Blevins

(57) ABSTRACT

A twisted, multicore fiber communicates light input to each core to an output. The twisting mitigates relative time delays of the input light traveling through each of the cores in the multicore fiber to the output caused by bending of that multicore fiber. An example application is in an optical network that includes an optical input terminal and an optical sensor connected by a twisted multicore connecting fiber. One example of twisted multicore optical fiber is helically-wrapped, multicore fiber.

17 Claims, 13 Drawing Sheets

(51) Int. Cl.
*G01L 1/24* (2006.01)
*G02B 6/02* (2006.01)
*G01B 11/16* (2006.01)

(52) U.S. Cl.
CPC ............ *G02B 6/4405* (2013.01); *G02B 6/4413* (2013.01); *G02B 6/4427* (2013.01); *G02B 6/02042* (2013.01); *G02B 6/02285* (2013.01)

(56) References Cited

U.S. PATENT DOCUMENTS

| | | | |
|---|---|---|---|
| 6,389,187 B1 * | 5/2002 | Greenaway et al. | 385/13 |
| 6,542,228 B1 | 4/2003 | Hartog | |
| 7,369,249 B2 | 5/2008 | Kim et al. | |
| 2006/0215975 A1 | 9/2006 | Kim et al. | |
| 2007/0201793 A1 | 8/2007 | Askins et al. | |
| 2011/0109898 A1 | 5/2011 | Froggatt et al. | |

OTHER PUBLICATIONS

Written Opinion for PCT/US2012/042032, mailed Feb. 26, 2013.
International Preliminary Report on Patentability for PCT/US2012/042032, dated May 24, 2013.
Extended European Search Report for Application No. 20120801232, mailed on Dec. 3, 2014, 7 pages.

* cited by examiner

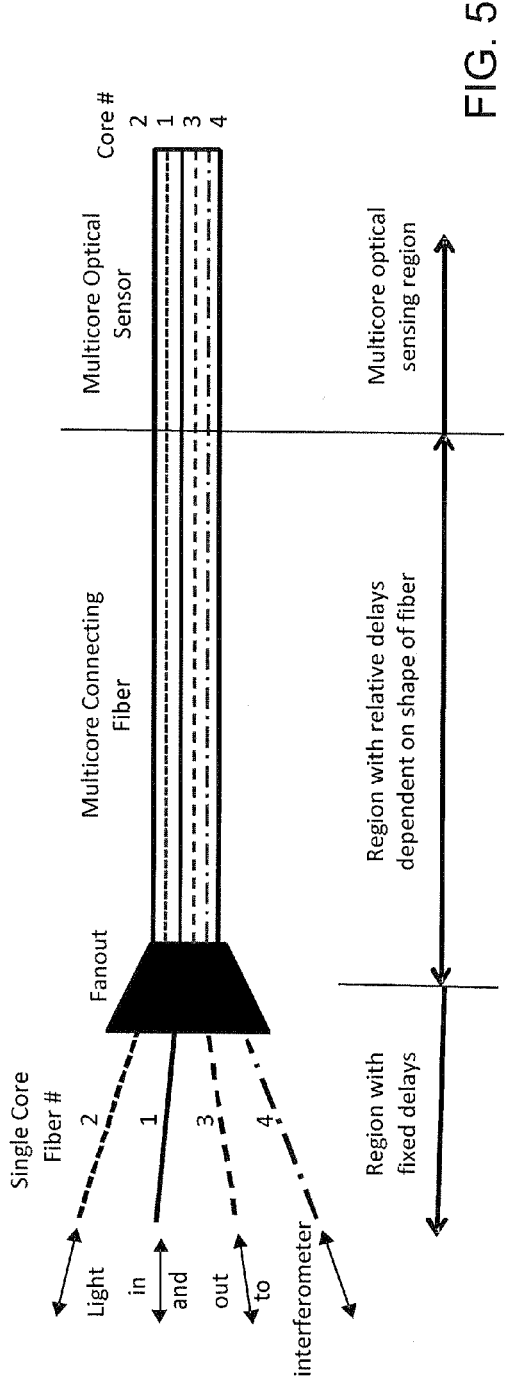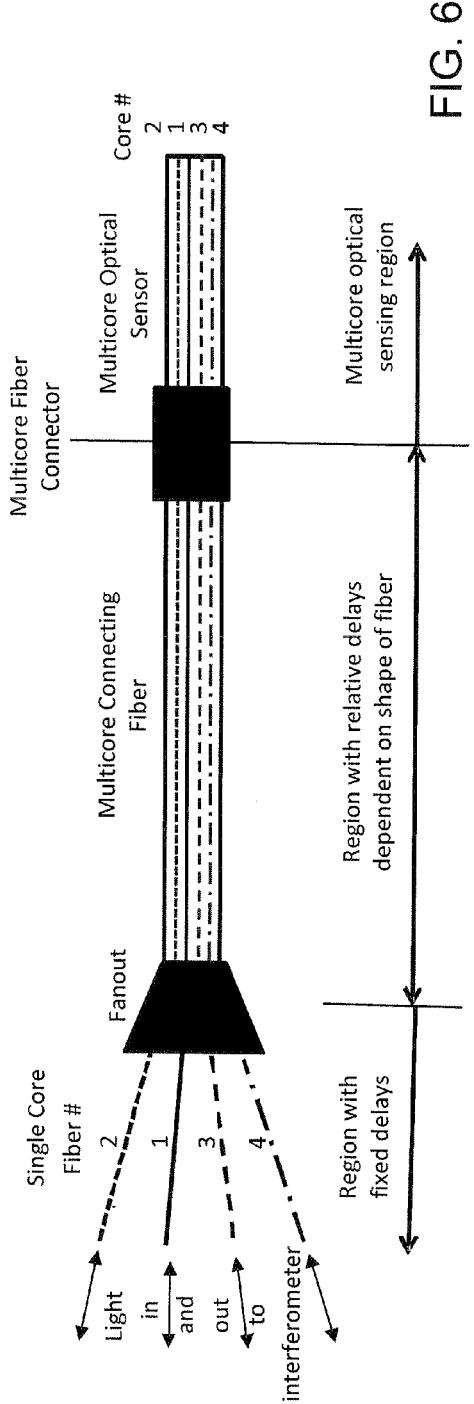

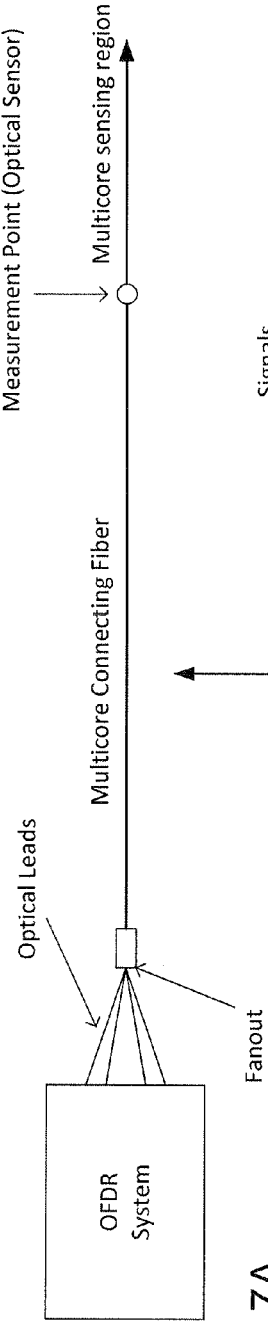
Figure 7A
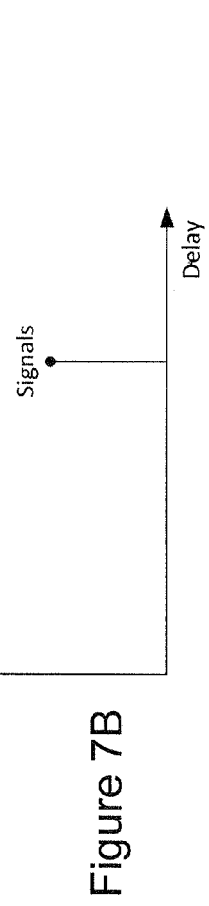
Figure 7B
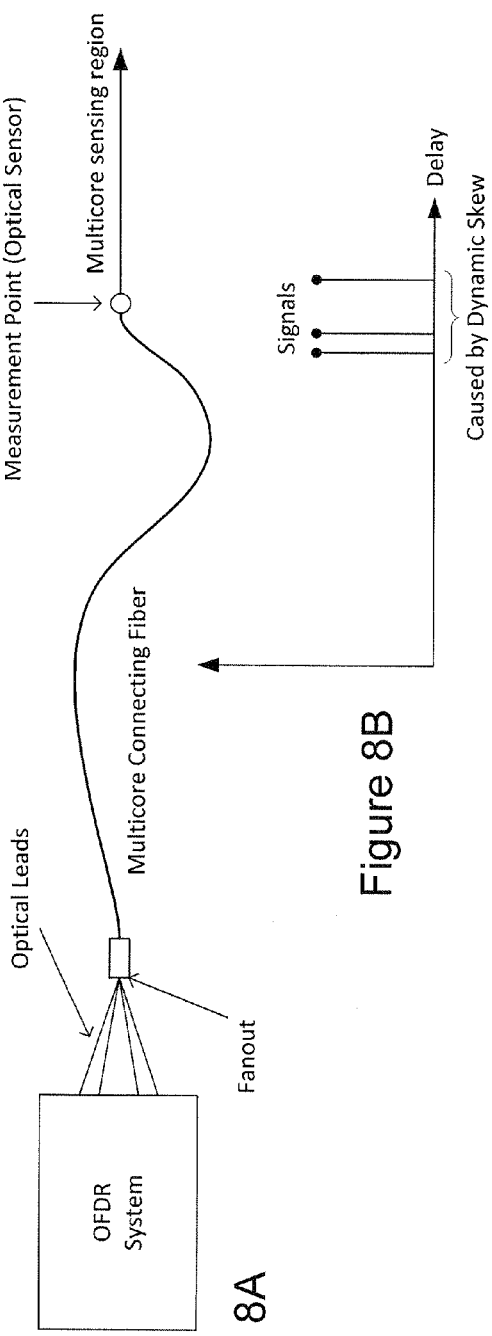
Figure 8A
Figure 8B

Computed shape for a sensor fiber in a "hairpin" configuration with no registration error.

Computed shape for a sensor fiber in a "hairpin" configuration with 1.0 ps registration error on outer core A.

Computed shape for a sensor fiber in a "hairpin" configuration with 2.0 ps registration error on outer core A.

Computed phase derivative for outer core A for the bent section of the "hairpin" shape with 2.0 ps registration error on outer core A.

Percent change of delays between straight fiber and a coiled fiber. The dashed line is the scan-to-scan variation recorded with the OBR 4600.

US 9,109,969 B2

CO-REGISTRATION OF CORES IN MULTICORE OPTICAL FIBER SENSING SYSTEMS

PRIORITY APPLICATION

This application is the U.S. national phase of International Application No. PCT/US2012/042032 filed 12 Jun. 2012 which designated the U.S. and claims priority from U.S. provisional patent application Ser. No. 61/496,600, filed on Jun. 14, 2011, the contents of which are incorporated by reference.

TECHNICAL FIELD

The technology relates to multicore optical fiber that may be used for example in optical fiber applications.

INTRODUCTION

Optical time domain measurements with high resolution and high sensitivity are achieved through the use of Optical Frequency Domain Reflectometry (OFDR). These measurements enable technology for important fiber-optic sensing technologies, such as distributed strain sensing. Distributed strain measurements performed on a multi-core optical fiber may be used to determine the three dimensional position of the fiber as detailed in commonly-assigned, U.S. patent application Ser. No. 12/874,901, filed on Sep. 2, 2010, and entitled, "Optical Position and/or Shape Sensing." A multiple channel OFDR is connected to several independent optical waveguides, or cores, within the multi-core optical fiber. To produce an accurate measure of the position and/or shape of the multi-core optical fiber, the independent OFDR measurements must be aligned with respect to the cross section of the fiber. OFDR measurements are optical based measurements, and changes in length of the cores within the multi-core optical fiber are observed as changes in optical delay. A method referred to as co-registration is used to ensure that variations in optical delay between the cores are correctly interpreted to ensure that each independent OFDR signal corresponds to the same physical cross section of the multi-core optical fiber. As practical systems are constructed and exposed to environmental influences, the method of co-registration becomes increasingly complicated.

An example OFDR system with an optical network that includes multiple interferometric interrogators is depicted in FIG. 1. The OFDR-based distributed strain sensing system 10 includes a tunable light source 12, an interferometric interrogator 16, a laser monitor network 14, an optical fiber sensor 18, acquisition electronics 20, and a system controller data processor 22. An overview of a distributed strain measurement using the OFDR system 10 is illustrated in flow chart form in FIG. 2. The steps in the flowchart are not necessarily sequential in time or performed in the order presented.

During an OFDR measurement, the light source 12 is swept through a range of optical frequencies (S1). This light is split with the use of optical couplers and routed to two interferometers. The first interferometer serves as the interferometric interrogator 16 and is connected to a length of sensing fiber 18. Light enters the sensing fiber through the measurement arm of the interferometric interrogator (S2). Light returns from the sensing fiber either by reflecting off of near-continuous string of low-reflectivity Fiber Bragg Gratings (FBGs), or if FBGs are not present, as back-scatter from intrinsic fluctuations in the effective index of the guided mode, known as Rayleigh scatter. Returned light from the sensing fiber then interferes with light that has traveled along the reference arm of the interferometric interrogator (S3). The second interferometer, within the laser monitor network 14, measures fluctuations in tuning rate as the light source is scanned through a range of optical frequencies (S5). The laser monitor network also contains a Hydrogen Cyanide (HCN) gas cell used to provide an absolute wavelength reference throughout the measurement scan (S4). A series of optical detectors convert the signals from the laser monitor network, gas cell, and the interference pattern from the sensing fiber to electrical signals (S6). A data processor uses the information from the laser monitor interferometer to resample the interference pattern of the sensing fiber such that it possesses increments constant in optical frequency (S7). This step is a mathematical requisite of the Fourier transform operation. Once resampled, a Fourier transform is performed by the system controller to produce a sensor fiber complex reflection signal in the temporal domain (S8). In the temporal domain, the reflection or scatter amplitude and phase of the FBGs or back-scattering events is depicted verses delay along the length of the fiber. Using the distance light travels in a given increment of time, this delay can be converted to a measure of length along the sensing fiber. In other words, the local reflection amplitude and phase of the string of FBGs or of the scattering events intrinsic to the fiber are now known as a function of distance along the fiber. The sampling period is referred to as the spatial resolution and is inversely proportional to the frequency range that the tunable light source was swept through during the measurement. If FBGs are present in the sensing fiber, the spatial derivative of the local phase is proportional to the local grating center wavelength, and this center wavelength will shift in response to local changes in fiber strain, so that the difference in phase from the unstrained state produces a continuous measurement of strain along the sensing fiber. Similarly, if FBGs are not present, as the fiber is strained, the local scatters will shift as the fiber changes in physical length. It can be shown that these distortions are highly repeatable. Hence, an OFDR measurement can be retained in memory that serves as a reference pattern of the fiber in an unstrained state. A subsequent measurement can be compared to this reference pattern to gain a measure of shift in delay of the local scatters along the length of the sensing fiber (S9). This shift in delay manifests as a continuous, slowly varying optical phase signal when compared against the reference scatter pattern. The derivative of this optical phase signal is directly proportional to change in physical length of the sensing core. Change in physical length may be scaled to strain producing a continuous measurement of strain along the sensing fiber (S10).

When the OFDR technique of distributed strain sensing is applied to a multi-core optical fiber for the purpose of shape sensing, each waveguide within the multi-core fiber is simultaneously measured. This can be performed by creating an OFDR system with an optical network that includes multiple interferometric interrogators, as depicted in FIG. 3.

Light from a tunable laser source (1) passes through a 2×2 coupler (2). One of the coupler outputs leads to the reference arm of the interferometer (3). Light in the reference path reflects off of a Faraday rotator mirror (4), and returns to the 2×2 coupler. A portion of the light from the reference path is split four ways at a 1×4 splitter (5), and coupled to 4 detector modules, designated D1 through D4. The other output of the 2×2 coupler (2) leads to a 1×4 splitter (6), forming four components of the measurement arm of the interferometer. Light passes through 4 circulators (7) to four input leads of a fanout (8), a device which combines light from multiple single core fibers into the multiple cores of the multicore fiber.

Light injected into the four cores of the multicore fiber (9) reflects back from the multicore sensor (10), pass back through the fanout (8), and is routed by the four circulators (7) to four 2×1 couplers (11), where light from the measurement arm is combined with light from the common reference arm of the interferometer. Each detector module D1 to D4 includes a polarization beam splitter and two photo detectors, which translate the optical interference patterns into electrical signals sampled by the data acquisition electronics. Each pairing of an interferometric interrogator with a waveguide in the multi-core fiber is referred to as an acquisition channel. As the tunable light source is swept, channel is measured simultaneously, and the resulting interference patterns from each of the channels are routed to a series of acquisition electronics adapted for the additional interferometers. Each channel is processed as described in the flowchart in FIG. 2. The distributed strain measurements recorded using a multiple-channel OFDR system from the waveguides can then be exported for storage or use in another computing device or processed further in the system data processor.

One example embodiment of a multi-core optical fiber possesses four cores, which serve as optical waveguides, along the length of the fiber. One such core is placed along the center axis of the fiber and at least three outer cores are placed concentrically about the center axis at a given radial separation. A cross section of a multi-core fiber is depicted in FIG. 4.

Returning to FIG. 3, on the single core side of the fanout 8 coupled to the circulators 7, the optical delays are determined by the length and index of refraction of the fiber used, and translation or bending of the fibers does not materially affect the delays. Temperature and longitudinal strain are the main reasons for changes in these delays and can be controlled by careful packaging of fibers and components. Delay differences between the leads in this region associated with the different cores are thus essentially static. In OFDR, a frequency shift in the optical frequency sampling domain produces an optical delay shift in the optical time delay domain, so static optical delays inherent to the optical network may be compensated by using fixed electronic frequency adjustments for each core in the OFDR system.

In contrast to these static delay differences between cores, optical delay differences between the cores in the multicore connecting fiber 9 on the combined output side of the fanout 8 in FIG. 3 are dynamic and may vary as a function of the position of the fiber and in time due to external stimuli. In the multicore connecting fiber 9, cores may experience different strains as the fiber is bent or manipulated (e.g., twisted), depending on the direction and tightness of the bend or twist, the distance of the core from the center, and/or the degree of intrinsic fiber twist. Application of tension, compression, or temperature change may also cause changes to the optical delay in each core to a fixed point on the fiber. However, the multicore connecting fiber in practice would typically be protected by a cable which would lessen the impact of tension, compression, or temperature change on optical delay. Also, in practice it is unusual for optical delays imparted by an applied twist to exceed those caused by bends in the multicore connecting fiber for the fiber geometry described in FIG. 4.

A multicore shape sensing system typically requires some physical separation between the fanout device 8 and the start of the region over which shape sensing is performed. That sensing region may also be referred to as an optical sensor. This is depicted in FIGS. 5 and 6. For example, the fanout may be located in an equipment rack, but the region to be sensed may be located several meters away. As a result, a multicore connecting fiber connects the fanout to the multi-core optical sensor. Practical installations may require the multicore connecting fiber to be moveable and spatially reconfigurable. When the multicore connecting fiber is bent or twisted, different dynamic strains are induced in each core of the multicore fiber, and an unpredictable loss of co-registration can occur in the multicore sensing region that varies with time as the multicore connecting fiber is moved. For example, a simple bend in the multicore connecting fiber causes compression of the cores located on the inside of its bend neutral axis and elongation of the fiber cores located towards the outside of its bend neutral axis. So even though the fiber cores in the multicore connecting fiber enter the multicore sensing region at the same physical location, the dynamic optical delay differences in the bent multicore connecting fiber caused by the compression and elongation result in a loss of co-registration that can no longer be compensated using static optical delay corrections referenced above.

One possible solution to this problem is to dynamically compensate for these delay changes by performing shape sensing in the entire region starting at the fanout device 8 through to the desired sensing region, allowing for the calculation of the different delays. However, this is undesirable because it requires time intensive calculations over regions for which such calculation is not required by the shape sensing application, i.e., there is no need to perform shape sensing calculations for the multicore connecting fiber. This approach may also require additional strain sensors, e.g., fiber Bragg gratings (FBGs), in regions where they would otherwise not be required. So this approach slows down the operation of a shape sensing system and increases its cost.

Another alternative for dynamic optical delay compensation is to locate a traceable feature within the various cores in the sensed region and track the feature over time. Such a feature might be a unique FBG amplitude or phase spatial pattern, a particular coherent Rayleigh scatter pattern of the fiber itself, a multicore connector reflection, a reflection from some termination of the fiber, a reflection intentionally introduced by spatially modulating the local index of refraction in the core or cladding near the core, or a loss event from a local absorption or transfer of light out of the core guided mode. But this alternative requires added complexity, time-consuming algorithms, possible optical component adjustments, and added cost. The ability to accurately sense shape for such a system is also limited by how well the registration can be maintained, and the accurate response to a changing shape may depend on the speed of the co-registration detection and compensation scheme.

A better solution is needed for the dynamic optical delay compensation problem for a multicore connecting fiber that does not suffer from these drawbacks.

SUMMARY

A twisted, multicore fiber communicates light input to each core to an output. The twisting mitigates relative time delays of the input light traveling through each of the cores in the multicore fiber to the output caused by bending of that multicore fiber. An example application is in an optical network that includes an optical input terminal and an optical sensor connected by a twisted multicore connecting fiber. One example of twisted multicore optical fiber is helically-wrapped, multicore fiber.

One aspect of the technology includes a method for reducing a variable level of optical skew in an optical network including an optical input terminal and an optical sensor. The optical input terminal and the optical sensor are connected using a twisted multicore fiber. Relative time delays of light traveling through each of the cores in the multicore connecting fiber are compensated for using the twist in the multicore fiber. The relative time delays of light are caused by one or more bends in the twisted multicore fiber and may depend on a shape of the twisted multicore fiber when connecting the optical input terminal and the optical sensor. The twisted multi-core fiber mitigates variable levels of optical skew in the light traveling to the optical sensor to provide co-registered light at the optical sensor.

Another aspect of the technology is a twisted, multicore optical fiber for communicating light input to each core to an output. The twisting of the multicore optical fiber mitigates relative time delays of the input light traveling through each of the cores in the twisted, multicore optical fiber to the output caused by bending of the twisted, multicore optical fiber.

A further aspect of the technology is an optical network that includes an optical input terminal, an optical sensor, and a multi-core connecting fiber connecting the optical input terminal and the optical sensor. The multi-core connecting fiber includes means for compensating for relative time delays of light traveling through each of the cores in the multicore connecting fiber caused by one or more bends in the multicore connecting fiber.

In an example implementation, one end of the twisted multicore fiber is coupled to receive input light from an optical interrogator, and the other end of the twisted multicore fiber is coupled to an optical device under test.

In a non-limiting example embodiment, the twist has a consistent direction along the length of the twisted multicore fiber. Moreover, a number of twists per unit distance along the twisted multicore fiber exceeds a number of twists per unit distance along the twisted multicore fiber to reduce effects of birefringence.

BRIEF DESCRIPTION OF THE DRAWINGS

FIG. 5 illustrates an example of a multicore connecting fiber connecting a fanout device with an optical sensor;

FIG. 6 shows illustrates an example of a multicore connecting fiber connecting a fanout device with an optical sensor using a multicore connector;

FIGS. 7A and 7B show an example of a multicore connecting fiber connecting a fanout device with an optical sensor and an associated optical delay that is essentially the same for all of the cores in the multicore connecting fiber;

FIGS. 8A and 8B show an example of a multicore connecting fiber connecting a fanout device with an optical sensor and different, dynamic optical delays associated with different ones of the cores in the multicore connecting fiber caused by bending;

DETAILED DESCRIPTION

Figure 1:
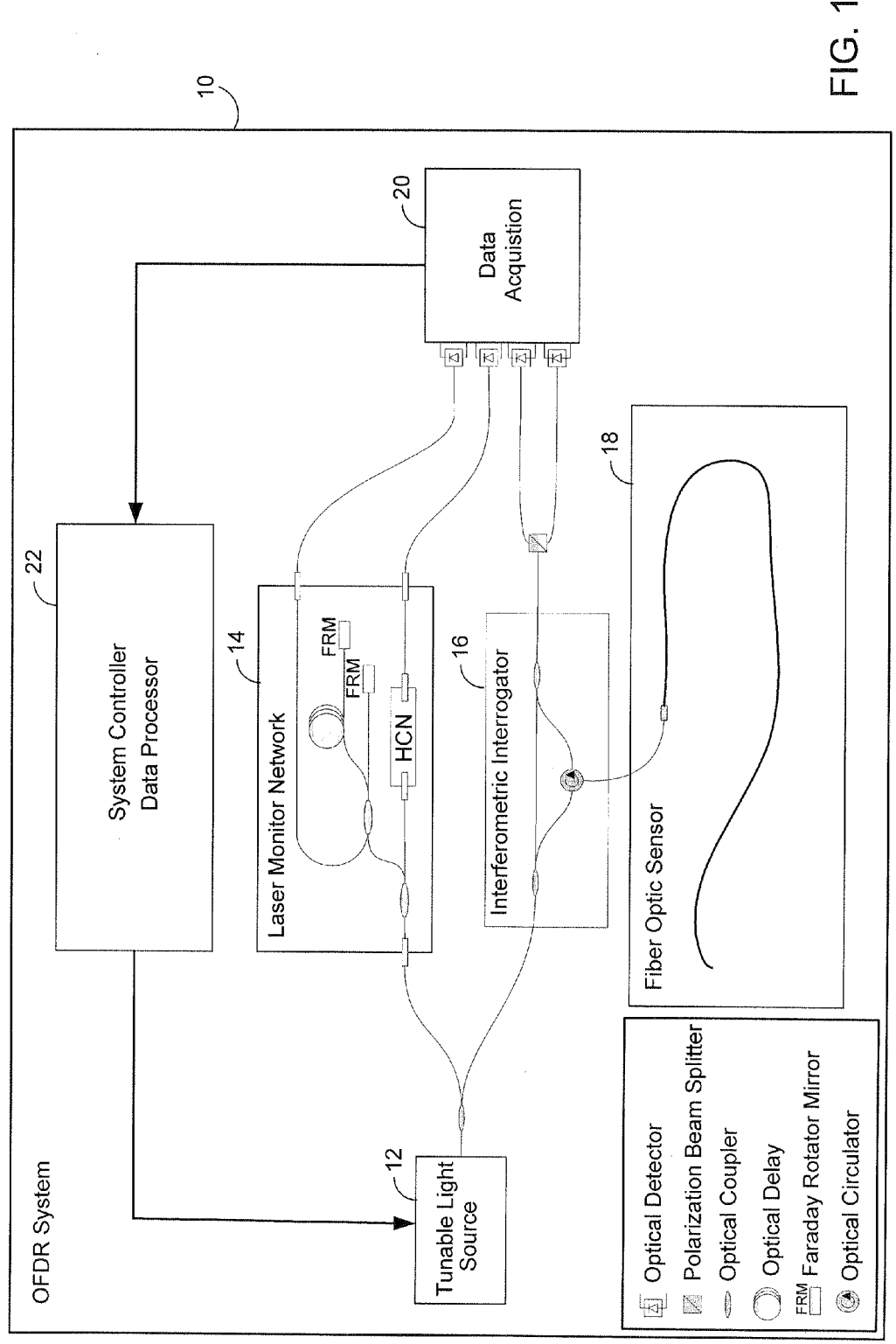
FIG. 1 shows an example OFDR system.

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not to obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Software program instructions and data may be stored on a non-transitory, computer-readable storage medium, and when the instructions are executed by a computer or other suitable processor control, the computer or processor performs the functions associated with those instructions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer-readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, a digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed.

Moreover, the term "processor" or "controller" also refers to other hardware capable of performing such functions and/or executing software, such as the example hardware recited above.

Figure 3:
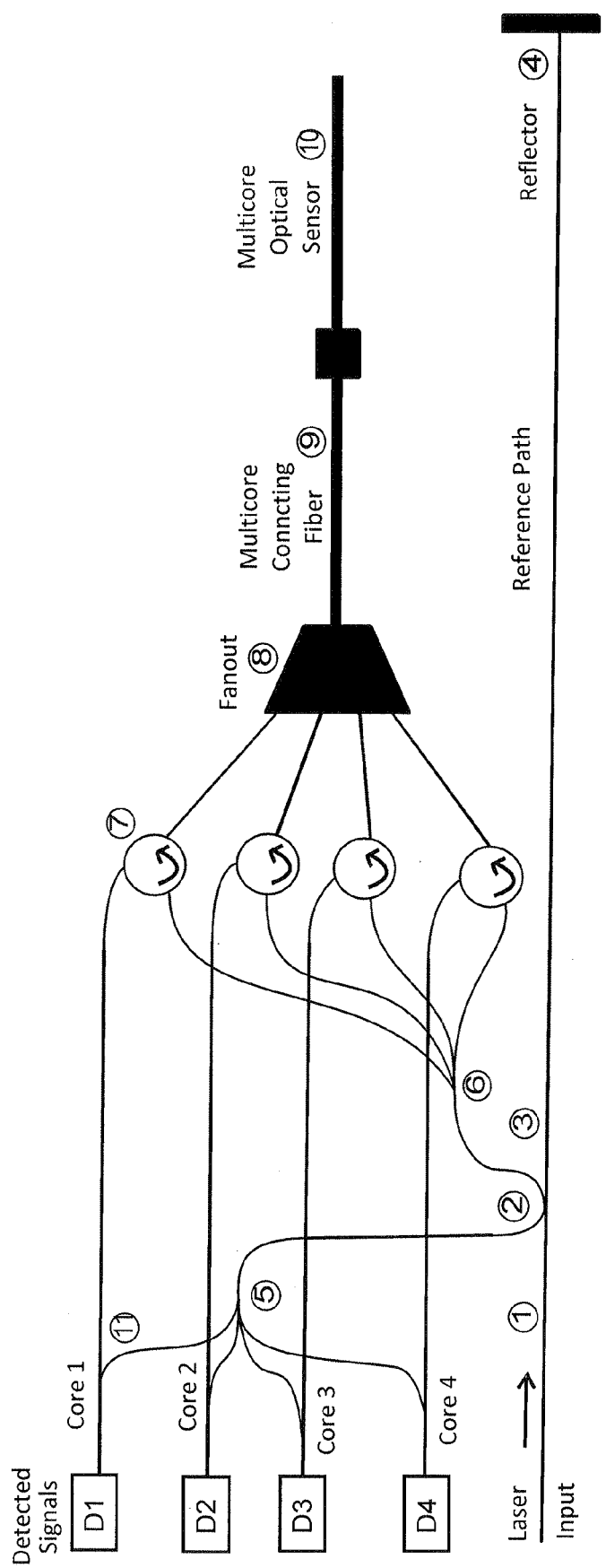
FIG. 3 shows an example OFDR system with an optical network that includes multiple interferometric interrogators.

FIG. 7A show an example of a multicore connecting fiber connecting a fanout device coupled to an OFDR system like that shown in FIGS. 1 and 3 with a multicore optical sensor. The measurement point may be any one or more locations along the multicore sensing region. FIG. 7A represents an ideal, but unrealistic, situation where the multicore connecting fiber is straight and the optical time delays in each core are identical. Because of that ideal situation, FIG. 7B shows an associated optical delay that is essentially the same for all of the cores in the multicore connecting fiber.

FIG. 8A also shows an example of a multicore connecting fiber connecting a fanout device with an optical sensor. But this example shows the realities of a practical optical network where the multicore connecting fiber is bent one or more times as is often the case when connecting the optical sensor to the OFDR system. More generally, there are dynamic, non-uniform stresses or strains on two or more its cores. FIG. 8B shows different, dynamic optical delays associated with different cores in the multicore connecting fiber caused by such non-uniform stresses or strains, e.g., bending the multi-core connecting fiber. These different, dynamic optical delays cannot be compensated with traditional static delay compensation techniques, but instead need to be aligned or co-registered using a dynamic optical delay compensation technique now described.

The inventors realized that the problems identified in this application are solved or greatly mitigated using a technological solution that is passive and simple: twisting the multicore connecting fiber between the fanout and sensing region. Advantageously, this solution does not require active dynamic tracking or delay computation.

Figure 9:
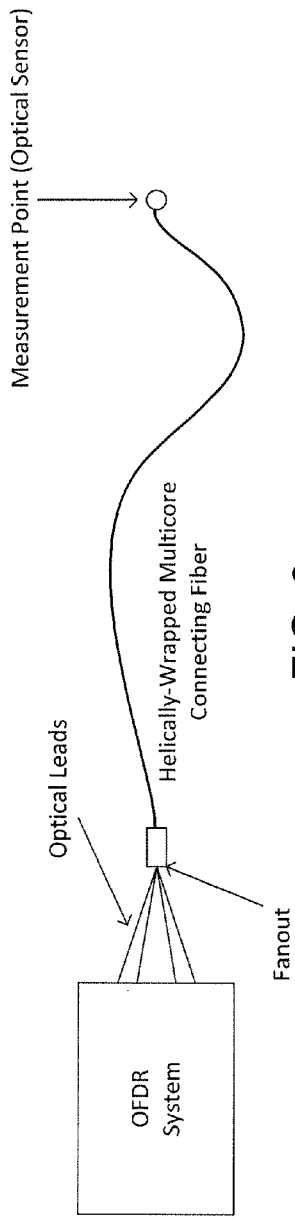
FIG. 9 shows a helically-wrapped multicore connecting fiber that mitigates different, dynamic optical delays associated with different ones of the cores in the multicore connecting fiber caused by bending.
Figure 10:
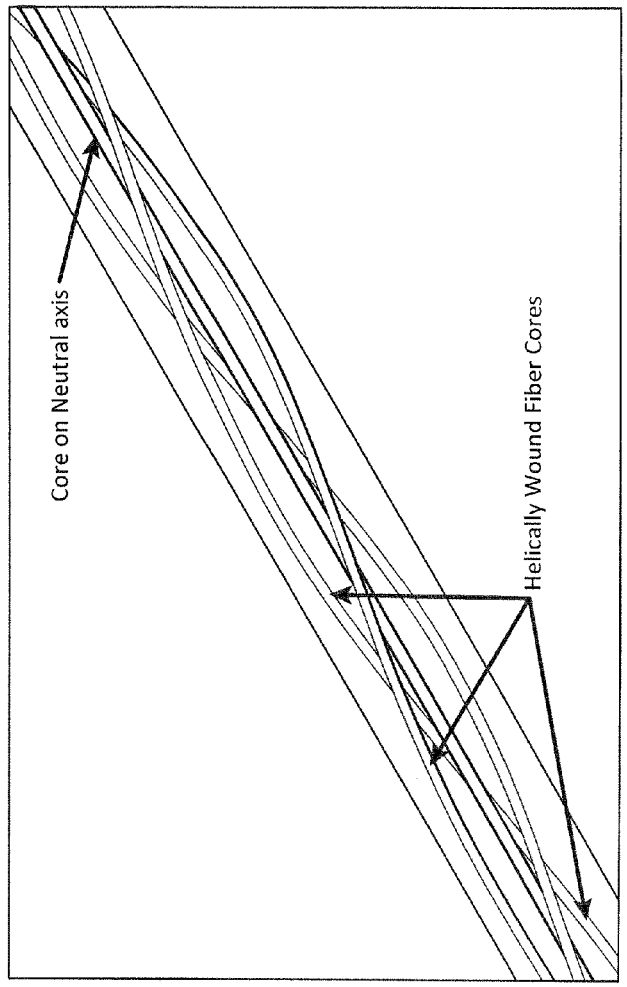
FIG. 10 is a perspective drawing showing an example of helically-wrapped multicore fiber.

FIG. 9 shows a helically-wrapped multicore connecting fiber that mitigates different, dynamic optical delays associated with different ones of the cores in the multicore connecting fiber caused by bending. FIG. 10 is a perspective drawing showing an example of helically-wrapped multicore fiber. This is simply one example of twisting the multicore connecting fiber, and other twisting configurations may be used.

If twists down the length of the multicore connecting fiber between the fanout and sensing region are purposefully added, the outer cores revolve around the center axis of the fiber. When the multicore connecting fiber is bent, the outer cores pass through alternating zones of compression and extension. The net strain for each outer core cancels out to a large extent compared to the untwisted multicore connecting fiber. To average out bending strain effectively, it is desirable, though not required, that the twist period be small compared to the bend radius and extent of the bend. As the number of twists per length of fiber increases, the delay difference between cores, averaged over the entire length, approaches zero because there are many twist revolutions within each bend region.

These twists in the multimode connecting fiber may be imposed after the fiber is manufactured by twisting the fiber and holding it in this twisted state mechanically, for example, by attaching the ends of the twisted multicore connecting fiber to a torsional rigid element in a cable. Alternatively, twist may be imparted to the fiber during the process in which the preform is drawn into fiber, permanently imparting a twist that is stable when no external forces are acting on the multicore connecting fiber.

If some or all cores of the multicore connecting fiber exhibit birefringence (whether inherent to the core or induced by bending), substantial fiber twisting also reduces the optical delay change associated with polarization changes. If the multicore connecting fiber is twisted with a period close to or shorter than the birefringence beat length, the incident light generally alternates between propagating along the fast and slow birefringence axes so that differences in optical delay due to birefringence largely cancel out in both the center and outer cores. The mitigation of polarization mode dispersion (PMD) caused by fiber birefringence by twisting the fiber is known for single core fibers; however, for PMD mitigation it is preferred to periodically alternate the twist direction with a period of meters to tens of meters, with maximum twist rates typically limited to 10 twists per m or less. Practically this means there are some locations on the fiber that have no twist. For mitigation of bend-induced optical delay differences in multicore fibers, it is preferable, for example, that the twist period be equal to or shorter than the smallest induced bend radius all along the fiber. In other words, a typical twist profile for PMD mitigation is not satisfactory for significant mitigation of bend-induced delays.

There are some disadvantages with using twisted multicore connecting fiber. The fanout is easier and less costly to make if the fiber is untwisted since the single core fibers more readily attach to an untwisted multicore fiber with lower loss. Additionally, twisted fiber is more expensive than untwisted fiber because it requires an increasingly complicated draw setup and process. Using twisted fiber also complicates the making of a multicore fiber connector, wherever such a connector is needed in the system between the fanout and sensed region as shown in the example in FIG. 6. Such a connector must be polished carefully to compensate for core rotation as material is removed if the fiber is twisted. But these disadvantages of incorporating twisted multicore fiber between the fanout and the sensing region are typically outweighed by the advantages of greatly reduced optical delays associated with bending in the multicore connecting fiber.

Figure 2:
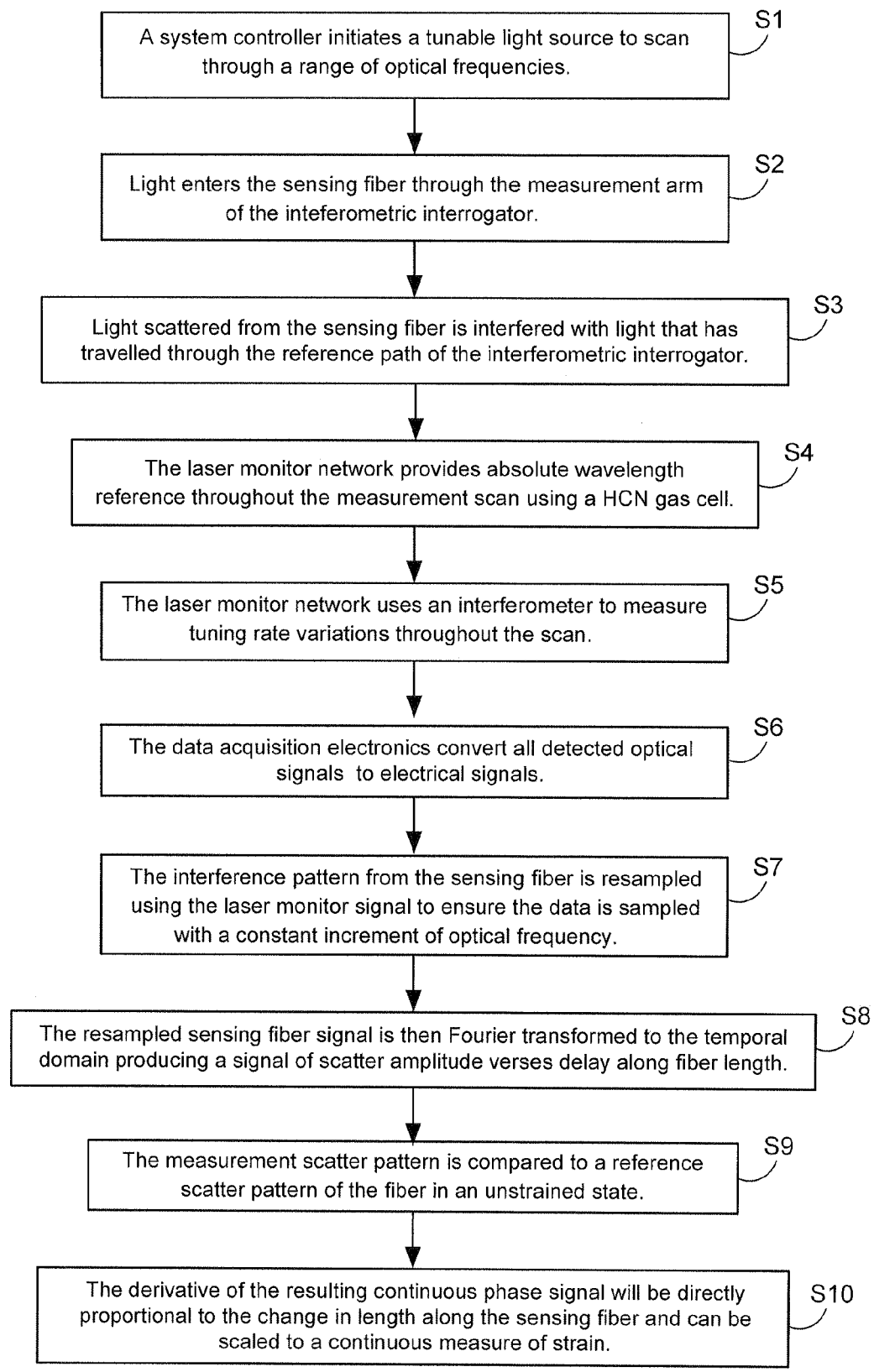
FIG. 2 is a flowchart illustrating example procedures performed in the OFDR system.
Figure 4:
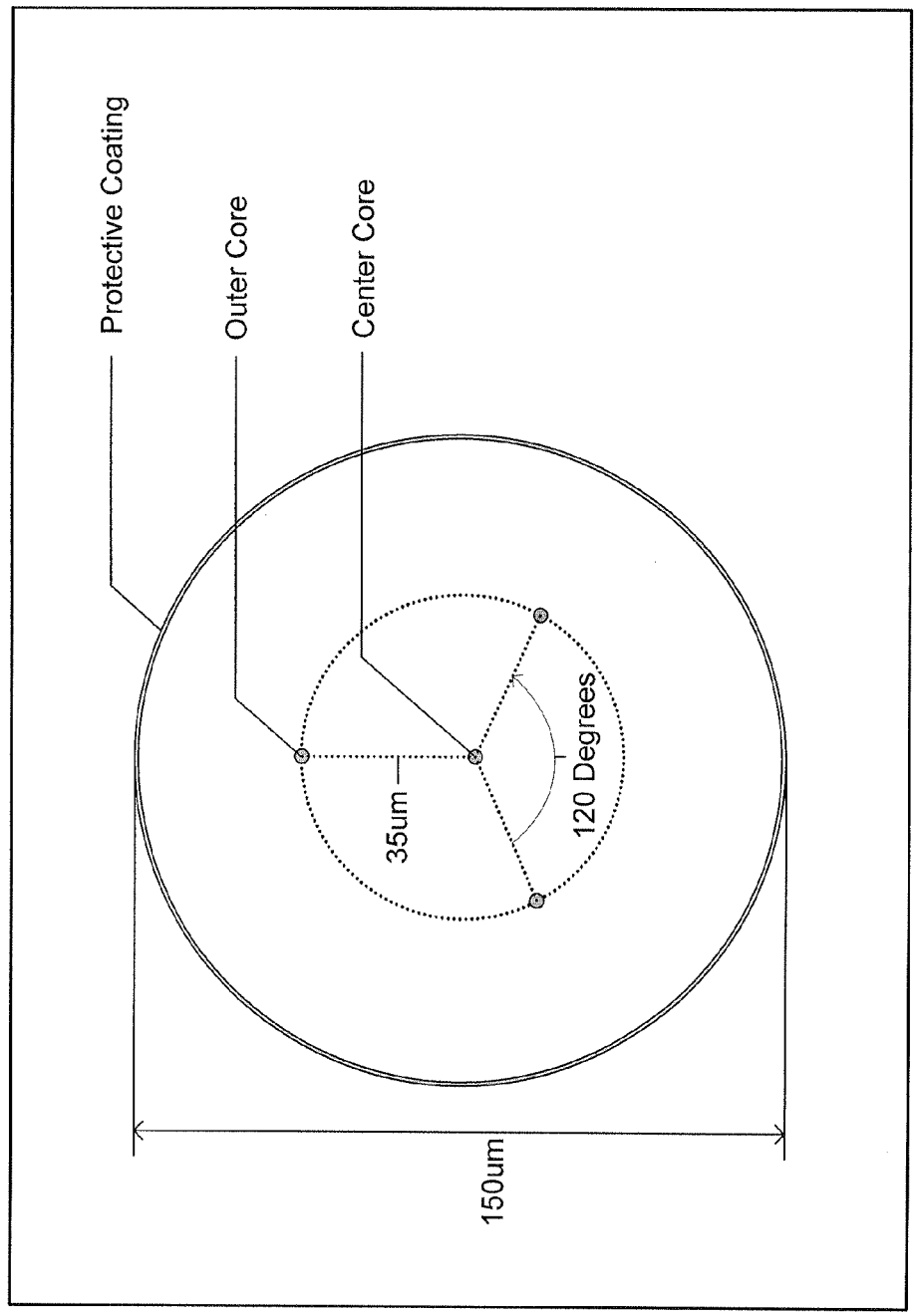
FIG. 4 shows a cross section of an example multicore fiber.
Figure 11:
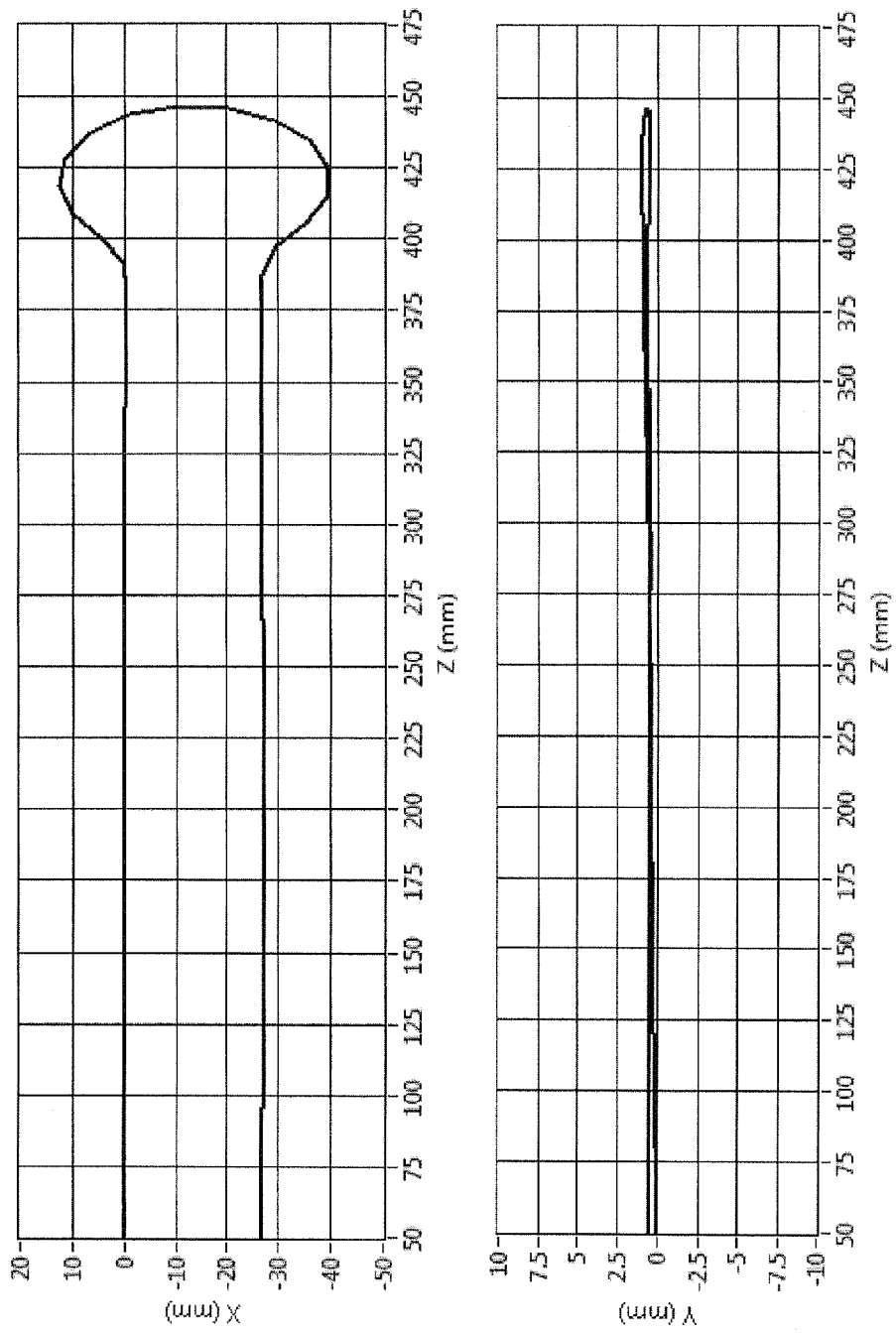
FIG. 11 includes X axis and Y axis graphs for a sensor fiber hairpin configuration with no registration error.
Figure 12:
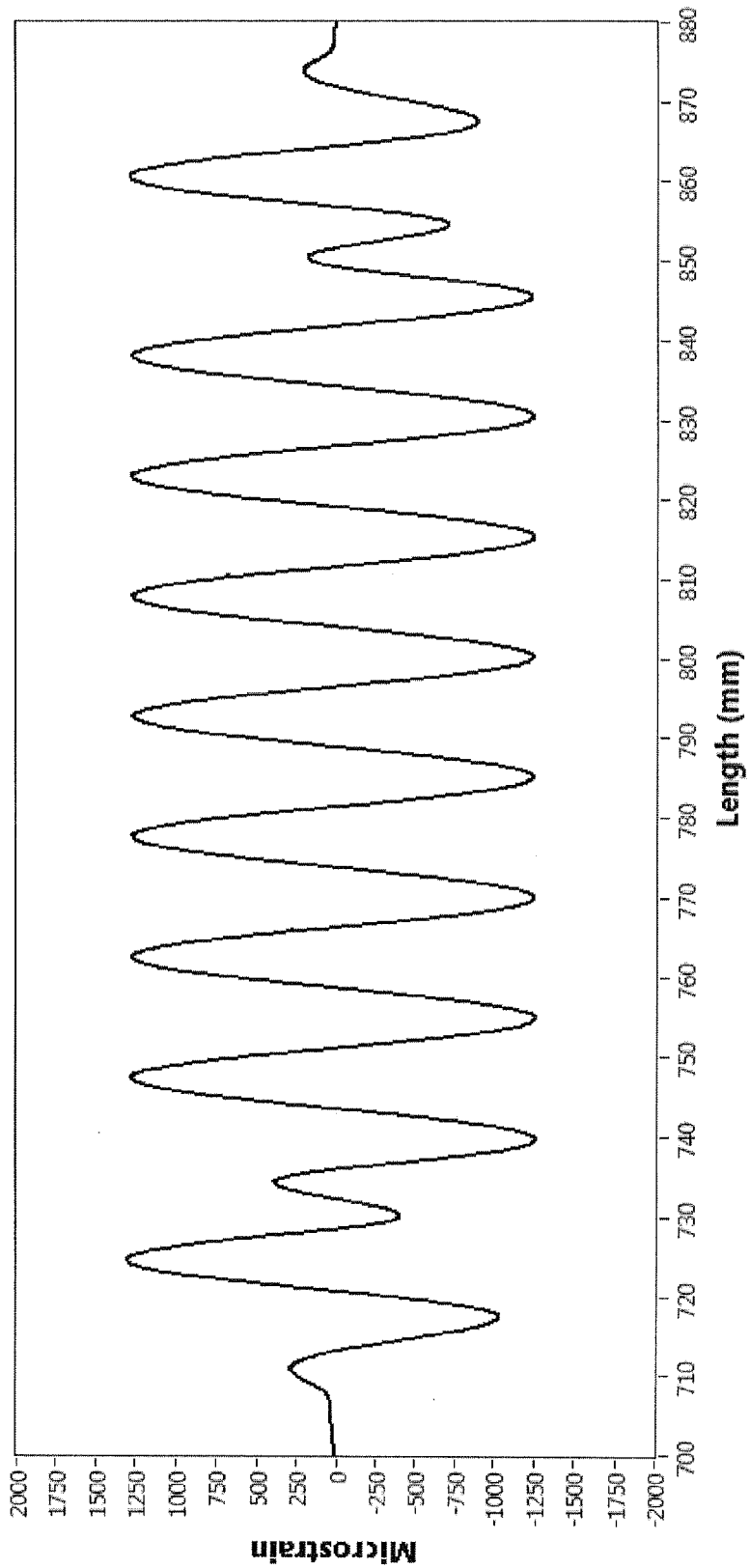
FIG. 12 is a graph of a phase derivative for an outer core for the bent section of the hairpin section.

The following describes an actual non-limiting example demonstration of a twisted multicore connecting fiber. First we show the detrimental effects on the shape calculation of an unaccounted for 1.0 and 2.0 ps delay in one of the outer cores, then we show that such delays are possible by bending an untwisted multicore connector fiber in a coil, and that such delays are reduced by two orders of magnitude in twisted multicore connector fibers. A shape sensing system was built using 4 cores of a 7 core multicore fiber with a mean effective index of refraction near 1.468, the 4 cores being arranged as in FIG. 4, with a center core to outer core spacing of 35 um, outer cores at 120 degree intervals, and a fiber cladding diameter of 125 um, containing FBGs with recognizable gaps between gratings. The tunable laser was swept over 9.6 nm range centered at 1540 nm, creating an OFDR spatial point spacing of about 0.083 mm. Data was taken at a 100 MHz sample rate and the laser swept at a rate of $3.2 \times 10^6$ GHz/s, which led to a maximum sensed length of 1.55 m. The system used a multicore optical sensor of length 1.25 m with a multicore connector, a multicore connector fiber length of 1.5 m, and a reference path length difference 1.5 m longer than the distance to the connector. Hence, the entire sensed region was located between 0.25 and 1.5 m closer to the launch than the reference reflector. The maximum sensed distance of 1.55 m means that, even if the 1.5 m multicore connector fiber was to be sensed, the OFDR system could not do so without slowing down the laser sweep rate or increasing the sampling rate to increase the maximum sensed range without violating the Nyquist sampling limit. The optical sensor cores were resealed and co-registered to ensure strains measured at the same delay in each optical sensor core occurred in the same locations in the fiber. The optical sensor fiber was placed in a "hairpin" shape in the X-Z plane including a 45° CCW bend, a 270° CW bend, and a 45° CCW bend, so that the end of the optical sensor was parallel to its other starting end, but offset by 27 mm. The optical sensing fiber was flat in the Y-Z plane. The strains for each core were computed using the procedures outlined in FIG. 2, and local bend and twist were computed from those strains and used to generate the shape in the X-Z and Y-Z planes as shown in FIG. 11. FIG. 11 shows a computed shape for an optical sensor fiber in a "hairpin" configuration with no registration error. In-plane and out-of-plane discrepancies between the calculated and physically measured fiber shape were less than 1 mm. The phase derivative signal for outer core A, which is proportional to the strain induced in that core in moving the fiber from the straight reference position into the test position, is shown in FIG. 12.

Figure 13:
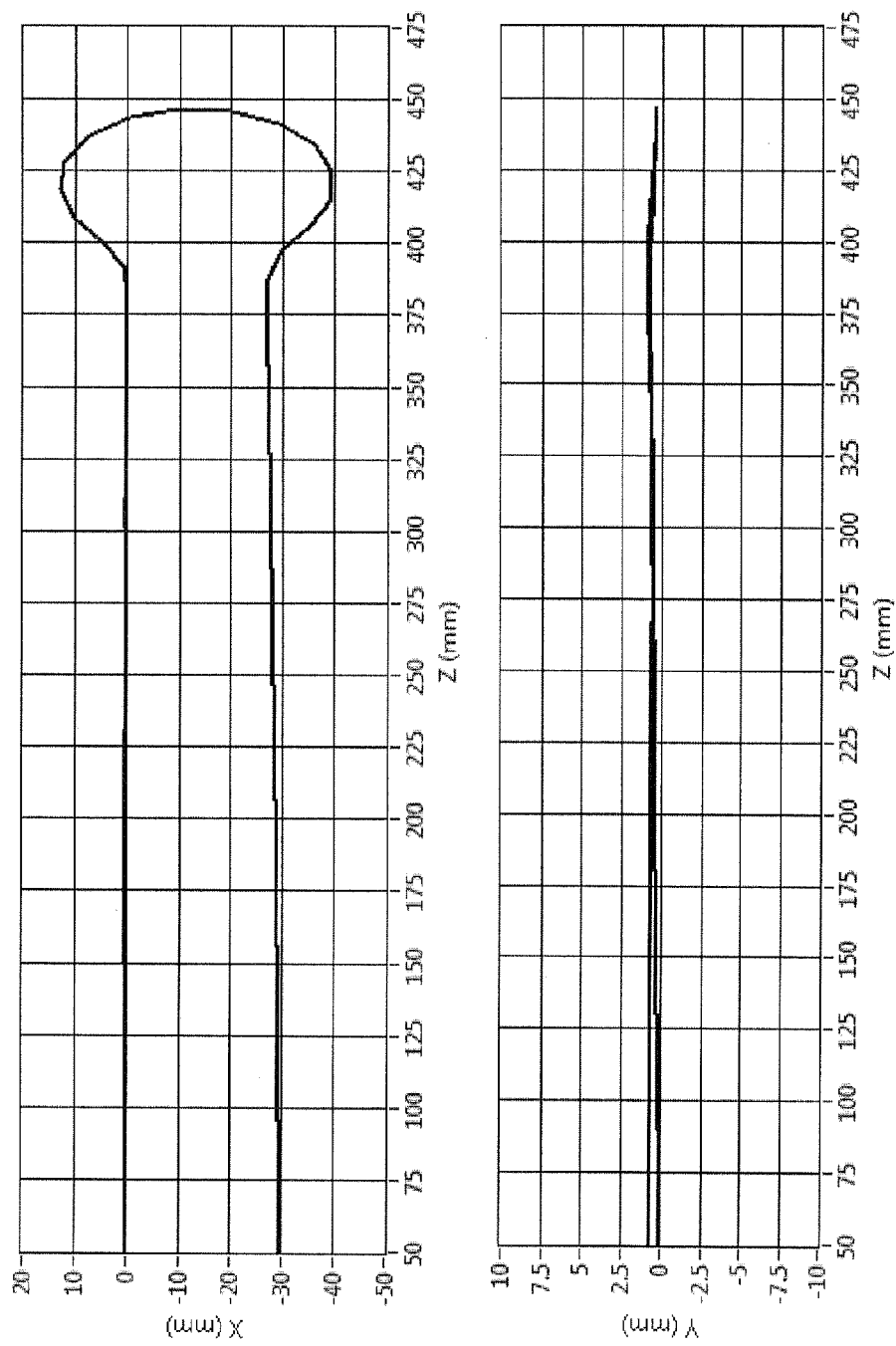
FIG. 13 includes X axis and Y axis graphs for a sensor fiber hairpin configuration with a 1.0 ps registration error on an outer core.

The optical delay in core A was modified to produce a 1.0 ps offset, and the shape for a sensor fiber in a "hairpin" configuration with 1.0 ps registration error on outer core A was re-computed and is illustrated in FIG. 13. The mis-registration of the strains in core A caused a distortion in the computed shape, such that the tip moved in X from 27 mm to 29.5 mm.

Figure 14:
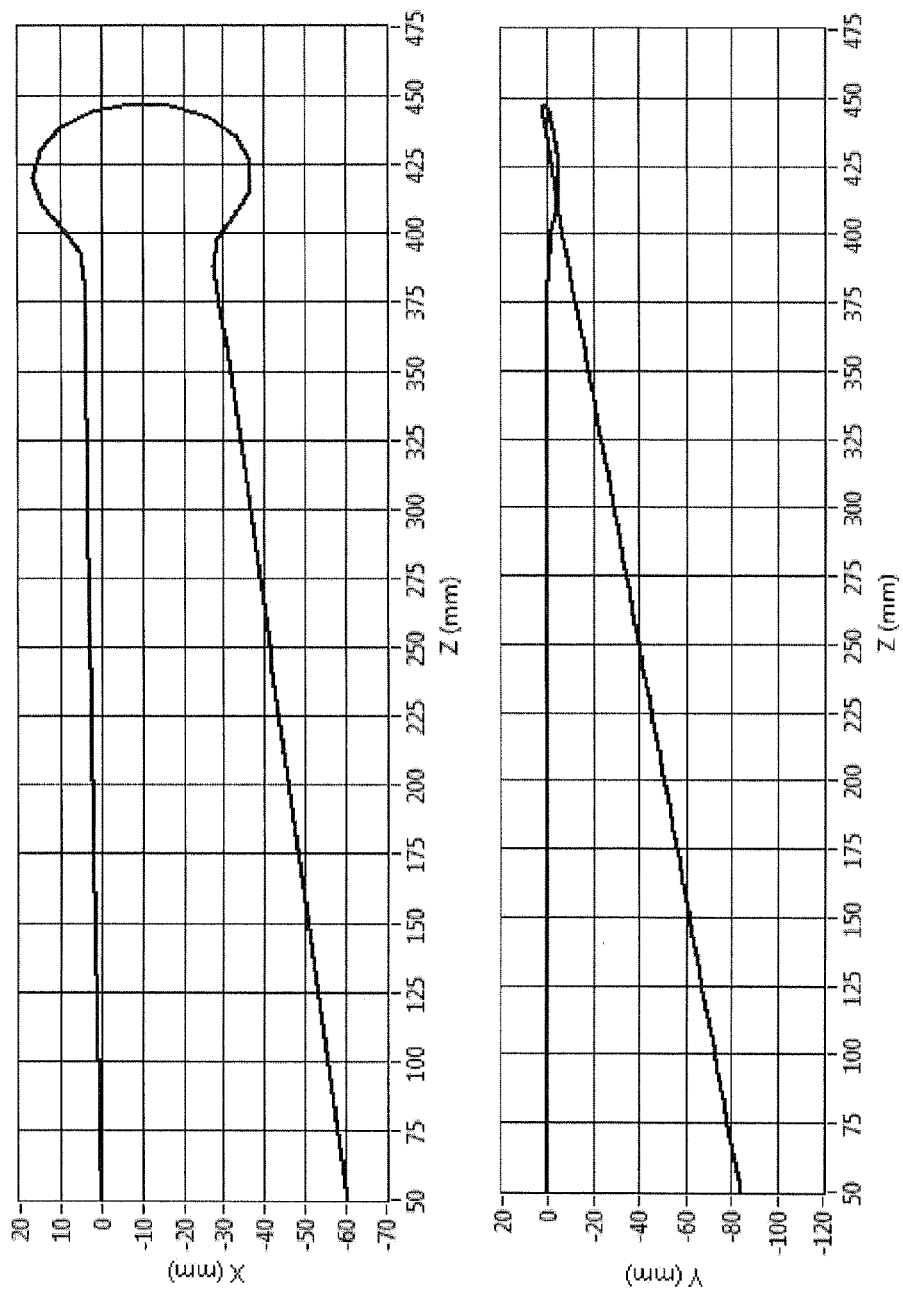
FIG. 14 includes X axis and Y axis graphs for a sensor fiber hairpin configuration with a 2.0 ps registration error on an outer core.
Figure 15:
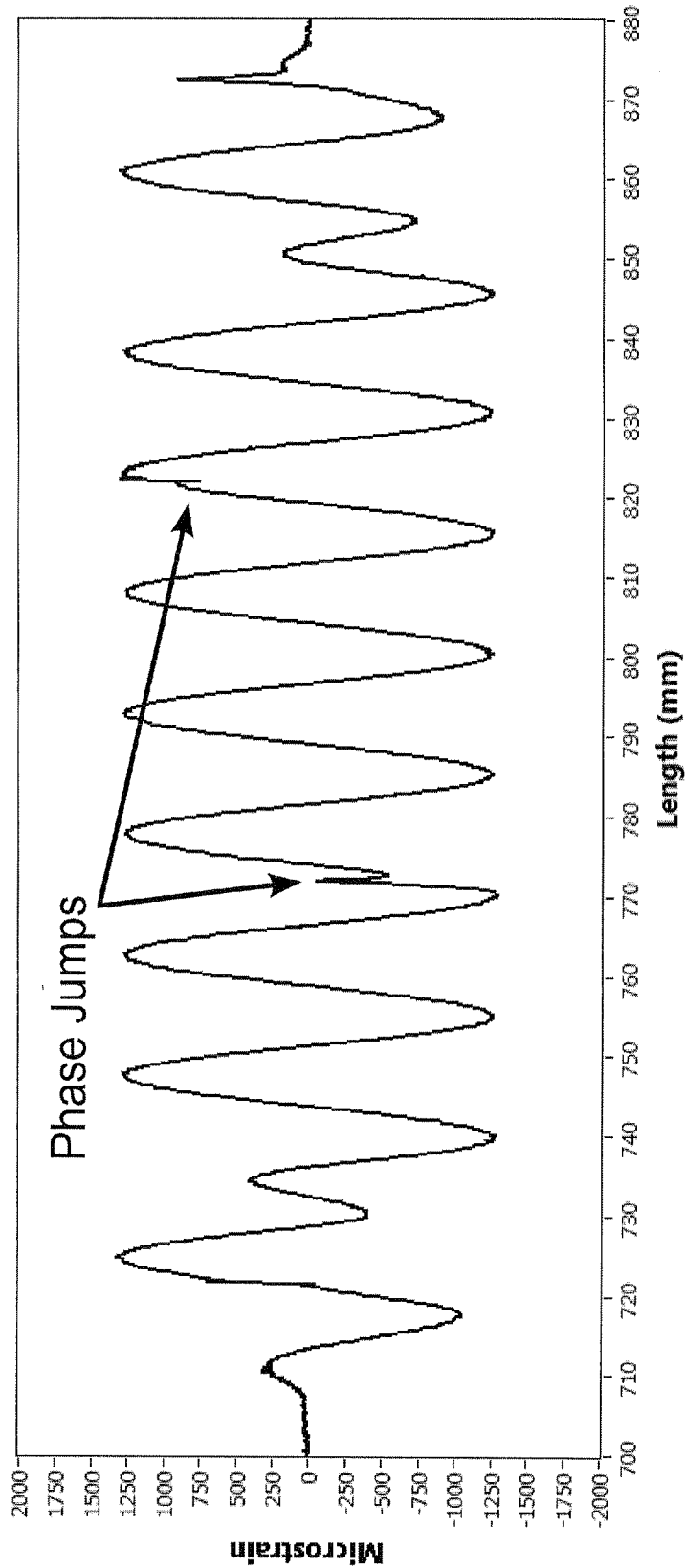
FIG. 15 is a graph of a phase derivative for an outer core for the bent section of the hairpin section with the 2.0 ps registration error.

The optical delay in core A was modified to produce a 2.0 ps offset, and the shape the shape for a sensor fiber in a "hairpin" configuration with 2.0 ps registration error on outer core A was re-computed and is illustrated in FIG. 14. In this case, the mis-registration of core A produced larger shape errors. The tip location error was over 30 mm in X and over 85 min in Y. Shape errors were more significant for a doubling of the registration error because of errors in the computed phase derivative for outer core A for the bent section of the "hairpin" shape with 2.0 ps registration error on outer core A as shown in FIG. 15. In this case, the registration error causes comparisons between the measurement state and the reference state of the optical sensor phase distribution to show large jumps that result in spurious signals, especially near the gaps between FBGs where the optical sensor phase tends to vary most rapidly and have the highest noise. Similar phase and shape errors result when even smaller registration errors are introduced when obtaining the optical sensor phase shift from the Rayleigh back-scatter signal instead of FBGs, typically for even lower amounts of optical delay registration error.

Figure 16:
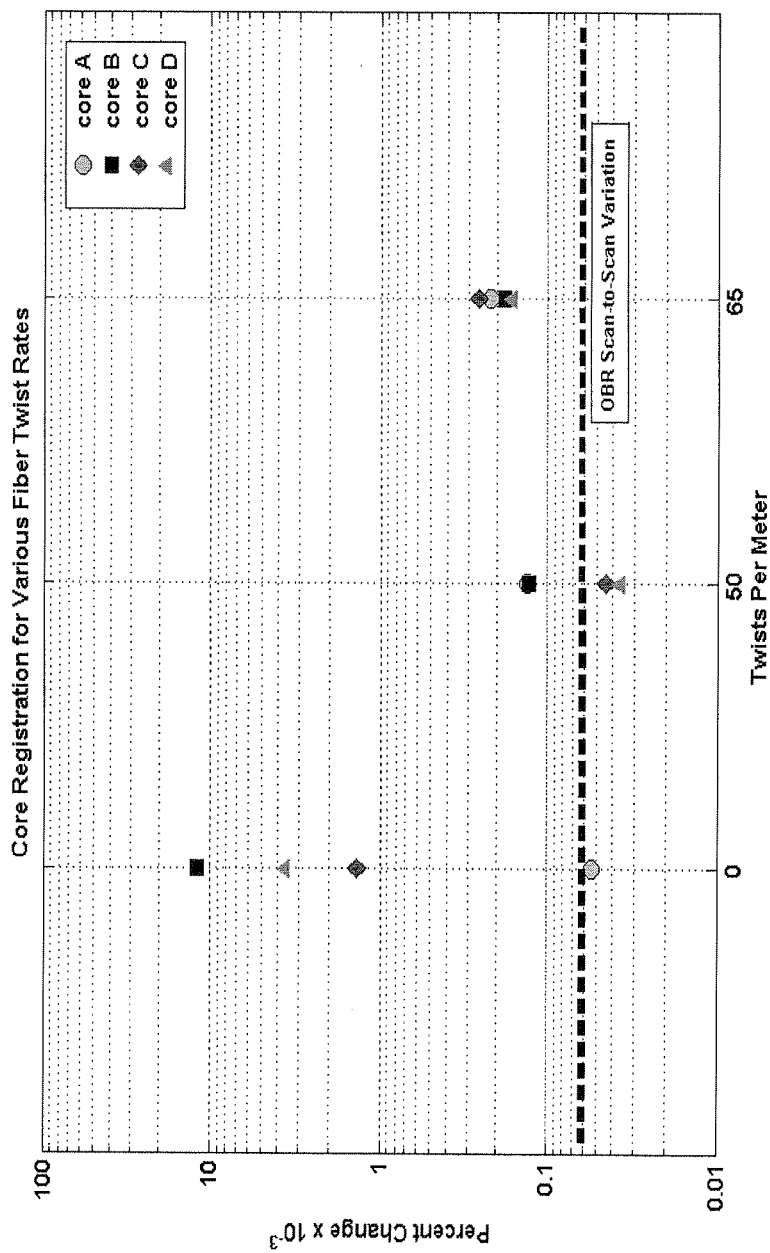
FIG. 16 is a graph showing example core registration for various fiber twist rates.

To demonstrate that using twisted multicore connecting fiber reduces the change in optical delay induced by a bend, the optical delays of 4 cores of multicore fiber segments which could be used as the multicore connecting fiber (with twist rates of 0, 50, and 65 turns per meter) were measured using a Luna Technologies Optical Backscatter Reflectometer (OBR) model 4600 before and after similar lengths of fiber were bent at a prescribed bend radius. The multicore fiber cross-section geometry was the same as that described in the preceding example, with center core to outer core spacing of 35 um, outer cores at 120 degree intervals, and a fiber cladding diameter of 125 um. Each multicore fiber segment was approximately 1.2 m in length and equipped with a multicore connector and a cleaved end. The multicore connecting fiber was connected to a fanout and the optical delay to the reflection peaks of the connector and cleaved end in each of the four cores of the multicore fiber segment under test were monitored with the OBR. The optical delay associated with each connector and cleaved end reflection peak was subtracted to find the total optical delay associated with each core of the multicore fiber test segment. Measurements of the total optical delay of each core were taken for each of the three multicore fiber test segments while positioned in a straight channel, and then while positioned in a 110 mm diameter coil. When winding the multicore fiber test segments in the 110 mm coil no attempt was made to control applied twist or applied strain. The percent change in optical delay was calculated for each core and shown in Table 1 below. The center core is designated "D", and the three outer cores designated "A", "B" and "C". The registration error that is particularly detrimental to shape accuracy is relative delay change between outer cores. The untwisted multicore fiber test segment fiber had a maximum variation in relative optical delay between the outer cores of $1.2 \times 10^{-2}$%; the 50 and 65 turn per m multicore fiber test segments both had a maximum difference in outer core delay of less than $1.0 \times 10^{-4}$%, a reduction of over 120 times. The observed scan-to-scan measurement variation of these measurements was measured by taking multiple scans of a fiber in the same physical state, and was measured to be approximately $5.8 \times 10^{-5}$%. A graphical representation of the measured optical delay changes is shown in FIG. 16. A $1.2 \times 10^{-2}$% optical path length error in one of the outer cores of a 1.5 m length of multicore connecting fiber would produces a 1.8 ps co-registration error and would lead to errors similar to those described in the FIGS. 14 and 15. An optical path length error of under $1.0 \times 10^{-4}$% for a 1.5 m multicore connecting fiber produces a co-registration error of less than 0.015 ps, and would lead to a shape reproduction error of much less than the 1 mm tip error for the shape depicted in FIG. 11.

TABLE 1

Percent change of delays between a straight fiber and a coiled fiber.

| Twists per Meter | Core A | Core B | Core C | Core D |
|---|---|---|---|---|
| Untwisted (0) | $5.31 \times 10^{-5}$ | $1.19 \times 10^{-2}$ | $1.27 \times 10^{-3}$ | $3.61 \times 10^{-3}$ |
| 50 | $1.32 \times 10^{-4}$ | $1.27 \times 10^{-4}$ | $4.41 \times 10^{-5}$ | $3.60 \times 10^{-5}$ |
| 65 | $2.18 \times 10^{-4}$ | $1.80 \times 10^{-4}$ | $2.61 \times 10^{-4}$ | $1.63 \times 10^{-4}$ |

The technology described applies to any multicore fiber system in which it is desirable to minimize the changes in optical path delay between cores in response to fiber bending or movement. When communication bandwidth is increased by using multiple parallel paths, and the parallel paths have different path lengths, the difference between the path lengths is known as "optical skew." Example embodiments of parallel optical transmission typically use multiple fibers bundled into the same cable. However, these systems could alternatively use a single fiber with multiple cores, or bundles of multicore fibers. For example, in a multicore fiber communication system, multiple communication signals might be transmitted through a fanout type device and propagate through a multicore fiber before being separated using another fanout type device and individually received. Such signals might be synchronized with fixed delays so that they can be predictably multiplexed or processed with the correct timing. Movement or bending of the multicore fiber in such a communication system leads to variable signal timing and loss of synchronization. In such a system, there is typically no capability to dynamically sense and correct for this dynamic optical skew. The multicore fiber length might be long, (e.g., many km), leading to meters of relative delay differences, depending on how the fiber is routed during installation, or how bends change after installation. Bend induced skew is a more challenging problem for multicore fiber compared to multiple fibers because in multicore fiber the cores cannot shift with respect to each other to reduce strain, as in a well-designed cable. Twisted multicore fiber mitigates this issue for such applications and eliminates the need for more complex and expensive skew compensation.

The technology is also not limited to the specific sensing configuration example. The number of cores, specific type of fanout device (if one is necessary or used), analog or digital communication and various modulation formats, type of interferometer network in a phase-sensitive system, and specific data processing may vary. As long as the relative delay of multiple cores is important in a system, and at some point, the cores are physically joined such that their relative delays are determined by the geometry of a local bend, or by the orientation of the polarization state to some built-in or induced birefringence, twisting the fiber to eliminate optical delay differences caused by bending is advantageous.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for reducing a variable level of optical skew in an optical network including an optical input terminal and an optical sensor, comprising:
   connecting the optical input terminal and the optical sensor using a twisted multicore fiber,
   compensating for relative time delays of light traveling through each of the cores in the multicore connecting fiber using the twist in the multicore fiber,
   wherein a number of twists per unit distance along the twisted multicore fiber exceeds a predetermined number of twists per unit distance along the twisted multicore fiber to reduce effects of birefringence.

2. The method in claim 1, wherein the relative time delays of light are caused by one or more bends in the twisted multicore fiber.

3. The method in claim 1, wherein the relative time delays of light depend on a shape of the twisted multicore fiber when connecting the optical input terminal and the optical sensor.

4. The method in claim 1, wherein the twisted multi-core fiber mitigates variable levels of optical skew in the light traveling to the optical sensor.

5. The method in claim 1, further comprising:
   coupling one end of the twisted multicore fiber to receive input light from an optical interrogator,
   and coupling the other end of the twisted multicore fiber to an optical device under test.

6. The method in claim 1, wherein the twisted multicore fiber provides co-registered light at the optical sensor.

7. The method in claim 1, wherein the twisted multicore fiber is helically-wrapped.

8. The method in claim 1, wherein the twist has a consistent direction along the length of the twisted multicore fiber.

9. A twisted, multicore optical fiber for communicating light input to each core to an output, wherein the twisting of the multicore optical fiber mitigates relative time delays of the input light traveling through each of the cores in the twisted, multicore optical fiber to the output caused by bending of the twisted, multicore optical fiber, wherein a number of twists per unit distance along the twisted multicore fiber exceeds a predetermined number of twists per unit distance along the twisted multicore fiber to reduce effects of birefringence.

10. The twisted multicore optical fiber in claim 9, wherein the twisted, multicore optical fiber mitigates variables levels of optical skew in the input light traveling to the output.

11. The twisted multicore optical fiber in claim 9 in an optical network, wherein one end of the twisted, multicore optical fiber is configured to receive input light from an optical interrogator, and the other end of the twisted, multicore optical fiber is connected to an optical device under test at the output.

12. The twisted multicore optical fiber in claim 9, wherein the twisted, multicore optical fiber provides co-registered light at the output.

13. The twisted multicore optical fiber in claim 9, wherein the twisted multicore optical fiber is helically-wrapped.

14. The twisted multicore optical fiber in claim 9, wherein the twist has a consistent direction along the length of the twisted multicore fiber.

15. An optical network, comprising:
   an optical input terminal;
   an optical sensor; and
   a multi-core connecting fiber connecting the optical input terminal and the optical sensor including means for compensating for relative time delays of light traveling through each of the cores in the multicore connecting fiber caused by one or more bends in the multicore connecting fiber,
   wherein a number of twists per unit distance along the twisted multicore fiber exceeds a predetermined number of twists per unit distance along the twisted multicore fiber to reduce effects of birefringence.

16. The optical network in claim 15, wherein the means for compensating includes twisting the cores in the multicore connecting fiber.

17. The optical network in claim 15, wherein the relative time delays of light depend on a shape of the multicore connecting fiber when connecting the optical input terminal and the optical sensor.

* * * * *